July 22, 1969     O. S. SUTTER     3,456,971
CLIP
Filed Sept. 20, 1967
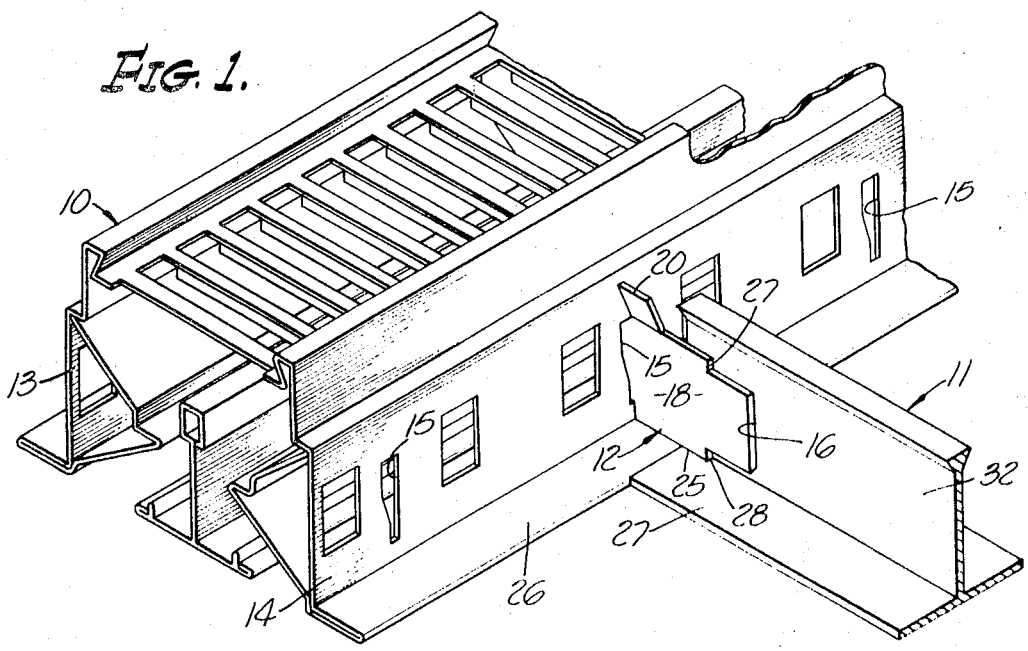
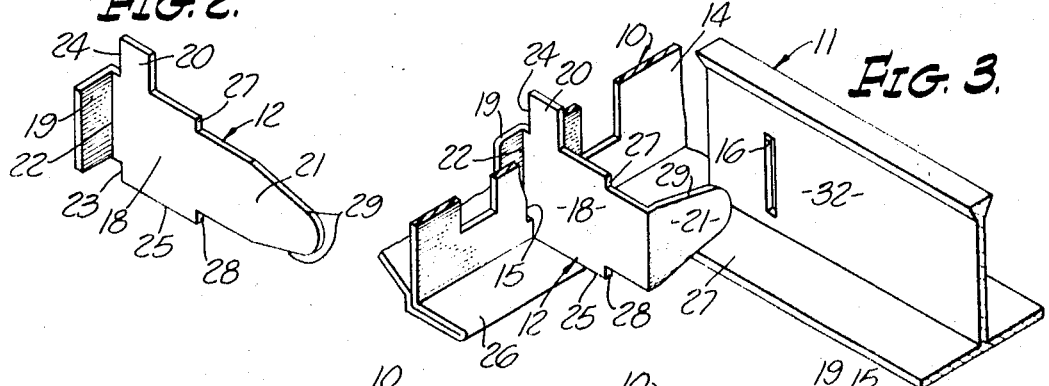
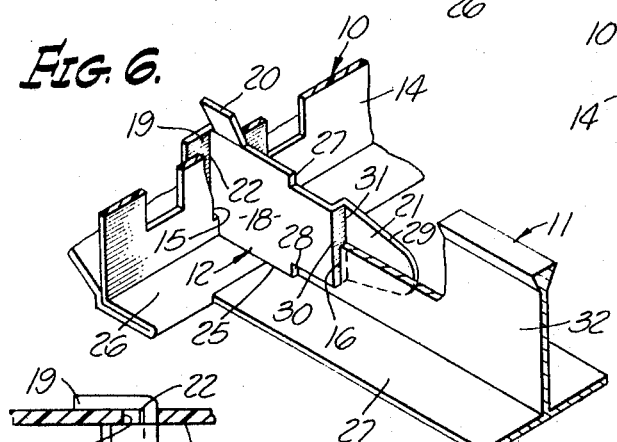
INVENTOR.
ORMOND S. SUTTER
BY Lyon & Lyon
ATTORNEYS

United States Patent Office 3,456,971
Patented July 22, 1969

3,456,971
CLIP
Ormond S. Sutter, Placentia, Calif., assignor to Lok-Products Co., Fullerton, Calif., a corporation of California
Filed Sept. 20, 1967, Ser. No. 669,098
Int. Cl. F16b *1/00, 3/00, 5/00*
U.S. Cl. 287—189.35             4 Claims

ABSTRACT OF THE DISCLOSURE

A clip for interconnecting members of a suspended ceiling. The ends of the clip fit into slots in components of a suspended ceiling, such as between an air diffuser and a ceiling grid member. The ends are bent to retain the members together, and the clip has a configuration and a depending tab to retain the members together in a proper relationship.

---

This invention relates to a clip and more particularly to a clip having a novel structural configuration for interconnecting members in a suspended ceiling.

Various devices such as clips and other structural connecting devices have been used from time to time to interconnect structural members. Typically, such devices are relatively complex in the structural combination of configuration thereof. Accordingly, it is an object of this invention to provide an improved clip for interconnecting members in a suspended ceiling.

It is an additional object of this invention to provide a relatively simple and inexpensive clip for structurally interconnecting members and which has a novel structural configuration for both facilitating manufacture and use thereof and for providing a good structural connection.

These and other objects and features of this invention will be better understood from the following detailed description taken in conjunction with the accompanying drawing in which:

FIGURE 1 is a partial perspective view of members of a suspended ceiling system interconnected by a clip according to the present invention;

FIGURE 2 is a perspective view of a clip according to this invention; and

FIGURES 3 through 6 illustrate the manner in which the clip of FIGURE 2 is employed to interconnect the ceiling members.

Turning now to the drawing, a first ceiling member 10 is interconnected with a second ceiling member 11 by means of a clip 12 according to the present invention. The ceiling members 10 and 11 form a part of a suspended ceiling system commonly employed in present-day buildings. The member 10 is a conventional linear air diffuser which is used in the air supply system and has sides 13 and 14 each of which includes a plurality of slots 15. The member 11 may be a conventional T ceiling grid member of a suspended ceiling and which is used for supporting ceiling panels, lighting fixtures and so forth. The member 11 includes a vertical slot 16. The ends of the clip 12 fit into the respective slots 15 and 16 for interconnecting the members 10 and 11 in a properly aligned relationship.

Turning now to the clip 12, the same may be inexpensively stamped from sheet metal and for purposes of description may be considered as having a body portion 18, tab 19, finger 20 and tongue 21. The tab 19 is bent at a ninety degree angle with respect to the body portion 18, the line of bend 22 being spaced from the end faces or shoulders 23 and 24 of the respective body portion 18 and finger 20 approximately equal to the thickness of the side 14 of the member 10. The tab 19 is inserted into a slot 15 as shown in FIGURE 4 with the bottom edge 25 of the body portion 18 resting against the flange portions 26 and 27 of the respective side 14 and grid member 11. The finger 20 is bent at an angle in the manner illustrated in FIGURES 1 and 5 to firmly secure the sides of the clip 12 substantially perpendicular to the side 14 of the member 10.

The tongue 21 extends from the body portion 18 and is reduced in height at the forward end 27 and 28 of the body portion 18 to fit within the slot 16. The smaller height of the tongue 21 eliminates the necessity of the slot 16 extending all the way down to the flange portion 27 of the grid member 11. The tongue is tapered at 29 to facilitate insertion thereof into the slot 16. The tongue 21 is bent at a ninety degree angle at a bend line 30, extends through the slot 16, and then is bent along a line 31 and flattened against the upright leg 32 of the grid member 11. In this manner, the members 10 and 11 may be quickly and simply interconnected in an abutting and properly aligned relationship.

The present embodiment of this invention is to be considered in all respects as illustrative and not restrictive.

What is claimed is:

1. A clip for interconnecting members of a suspended ceiling, said clip being a unitary member comprising:
   a body portion having first and second ends and a top and bottom,
   a tab extending from said first end of said body portion for extending through a slot in a first ceiling member and engaging a first side thereof,
   a tapered tongue extending from said second end of said body portion for extending through a slot in a second ceiling member and engaging the same, and
   a finger depending from said top of said body portion, said finger and the bottom and first end of said body portion forming respective upper and lower shoulders for engaging a second side of said first ceiling member and limiting the insertion of said clip into said slot in said first ceiling member.

2. A clip as in claim 1 wherein said tab is bent along a line displaced from said shoulders, said line being substantially parallel to said shoulders.

3. A clip as in claim 2 wherein said body portion has a lower edge substantially perpendicular to said shoulders for abutting flanges of said first and second ceiling members.

4. In a suspended ceiling arrangement, first and second ceiling members and a clip interconnecting said members comprising:
   said first ceiling member having a slotted side and a substantially perpendicular flange extending therefrom, said second ceiling member having a slotted leg and at least a flange extending substantially perpendicular from said leg,
   a clip engaging the slots in said ceiling members, said clip comprising a body portion having a lower edge engaging said flanges, a tab extending from a first end of said body portion and extending through the slot in said side of said first member, said tab being substantially perpendicular to said body portion, a tapered tongue extending from a second end of said body portion and extending through said slot in said second ceiling member, and a finger depending from the top of said body portion, said finger being at an angle with respect to said body portion for retaining said clip substantially perpendicular to said first ceiling member, said lower edge of said body portion and said finger forming respective shoulders, said shoulders and tab sandwiching said side of said first member for rigidly coupling said clip with said first member.

References Cited

UNITED STATES PATENTS

| 2,840,200 | 6/1958 | Wong | 287—189.35 |
| 2,888,113 | 5/1959 | Schwartz et al. | 287—189.35 |
| 3,010,550 | 11/1961 | Lydard | 287—189.35 |

FOREIGN PATENTS 994,701  6/1965  Great Britain.

MARION PARSONS, Jr., Primary Examiner

U.S. Cl. X.R.

287—189.36